United States Patent [19]
Monson et al.

[11] Patent Number: 5,120,395
[45] Date of Patent: Jun. 9, 1992

[54] METHOD FOR MAKING A GAS TURBINE ENGINE COMPONENT WITH A TEXTURED SURFACE

[75] Inventors: Paul J. E. Monson, Loveland; Seetha R. Mannava; Harry J. Heckler, both of Cincinnati; Robert E. Baeumel, West Chester, all of Ohio

[73] Assignee: General Electric Company, Cincinnati, Ohio

[21] Appl. No.: 611,611

[22] Filed: Nov. 13, 1990

[51] Int. Cl.$^5$ .......................... B44C 1/22; C23F 1/02
[52] U.S. Cl. .................................. 156/653; 156/654; 156/655; 156/656; 156/663; 156/668; 156/664; 219/121.69; 219/121.85
[58] Field of Search ............... 156/643, 654, 655, 656, 156/663, 664, 668; 219/121.67, 121.68, 121.69, 121.76, 121.84, 121.85; 29/889.2, 898

[56] References Cited

U.S. PATENT DOCUMENTS

| | | | |
|---|---|---|---|
| 3,440,388 | 4/1969 | Otstot et al. | 219/69 |
| 3,503,804 | 3/1970 | Schneider | 131/1 |
| 3,538,298 | 11/1970 | Duston et al. | 219/121.69 |
| 3,588,439 | 6/1971 | Heller et al. | 219/121 |
| 3,649,806 | 3/1972 | Konig | 219/121.69 X |
| 3,657,510 | 4/1972 | Rothrock | 219/121 |
| 4,063,063 | 12/1977 | Funck et al. | 219/121 |
| 4,125,757 | 11/1978 | Ross | 219/121 |
| 4,128,752 | 12/1978 | Gravel | 219/121 |
| 4,156,124 | 5/1979 | Macken et al. | 219/121 |
| 4,219,721 | 8/1980 | Kamen et al. | 219/121 |
| 4,250,374 | 2/1981 | Tani | 219/121 |
| 4,319,122 | 3/1982 | Pope et al. | 219/121 |
| 4,324,972 | 4/1982 | Furrer et al. | 219/121 |
| 4,328,410 | 5/1982 | Slivinsky et al. | 219/121 |
| 4,368,080 | 1/1983 | Langen et al. | 134/1 |
| 4,617,085 | 10/1986 | Cole, Jr. et al. | 156/643 |
| 4,720,621 | 11/1988 | Langen | 219/121 |
| 4,756,765 | 7/1988 | Woodroffe | 134/1 |
| 4,774,393 | 9/1988 | Tarumoto et al. | 219/121.69 |
| 4,806,731 | 2/1989 | Bragard et al. | 219/121.69 |

OTHER PUBLICATIONS

Lambda Physik, Hans-Boeckler-Strasse 12, D-3400 Goettingen, West Germany, Material Processing with Excimer Lasers.
Lambda Physik, Lambda Lasers, The UV-Tool for Industrial Applications (Marketing Brochure).
Lambda Physik, Excimer Lasers with Magnetic Switch Control.
Lambda Physik Highlights Nos. 1; 2; 3; 6, pp. 4; 7.
Lambda Physik Industrial Report No. 4, Excimer Laser Material Processing-Methods and Results, Oct. 1988.
Lambda Physik Industrial Report No. 6, Excimer Laser Processing of Ceramic Workpieces, Jun. 1989.
Proceedings of Inter. Society for Optical Engineering vol. 998, J. Sercel et al., Excimer Beam Applications, pp. 76-83, Sep. 6, 1988.
Society of Photo-Optical Instrumentation Engineers, vol. 1023, Excimer Lasers and Applications, 1988, pp. 141-152, 166-215, 236-241.

*Primary Examiner*—William A. Powell
*Attorney, Agent, or Firm*—Charles L. Moore, Jr.; Jerome C. Squillaro

[57] ABSTRACT

A method for making a gas turbine engine component includes the steps of: providing an unfinished gas turbine engine component; and selectively patterning a selected surface portion of the engine component by focusing a laser beam on the selected surface portion to improve lubricant distribution between the patterned surface of the engine component and a surface of another engine component in contact with the patterned surface during engine operation.

15 Claims, 2 Drawing Sheets

METHOD FOR MAKING A GAS TURBINE ENGINE COMPONENT WITH A TEXTURED SURFACE

BACKGROUND OF THE INVENTION

The present invention relates to the fabrication of gas turbine engine components and the like, and more particularly, to a novel method for making a gas turbine engine component or the like with a textured surface to improve lubrication distribution between components with interacting or contacting surfaces.

The texture or pattern in the surface of a finished component is of importance if that surface is in contact with or otherwise interacts with the surface of another component. Tribological studies have shown that the wear performance of surfaces are a function of their surface texture or roughness. Under conditions of restricted lubrication, micro-pores can be formed in a surface to act as tiny lubrication reservoirs, or the surface may be specifically patterned to promote lubricant distribution. Surfaces having such micro-pores have been found to out perform conventional smooth finished surfaces; the useful lives of these components have increased relative to the lives of conventional smooth surface components.

Conventional methods for texturing or patterning a surface, used in heavy industry, such as gas turbine engine manufacturing, Basically include mechanical processes, such as grit blasting, honing, grinding and the like. Each of these methods involves contacting a surface with an abrasive medium; these methods typically are not easily controlled for very precise surface patterning, and would not generally be employed where a particular pattern is desired to promote lubricant distribution across the surface of a finished component. Conventional surface texturing operations can also introduce undesirable deformation or other damage into the surface or substrate; the abrasive material may become embedded in some parent materials or otherwise leave behind particulate contaminants or residue which will require an additional process step to clean the surface and remove any contaminants or residue.

Precision patterning of surfaces may become even more critical as nonmetallic composite materials, such as PMR-15 (a glass or carbon fiber composite with an amide resin), find greater application in devices subjected to high stress and heat, such as the components of a gas turbine engine or the like. Conventional surface patterning methods are not applicable to these composite-type materials for the same reasons previously discussed.

The use of excimer lasers (ultra-violet lasers) for material processing, such as micro-machining and deposition of metallic and insulator films is described in marketing and technical literature published by LAMBDA PHYSIK GmbH, a leading manufacturer of excimer lasers, whose address is Hans-Bockler-Str. 12, D-3400, Gottingen, Federal Republic of Germany, and in U.S. Pat. Nos. 4,617,085; 4,756,785; 4,720,621; 4,368,080; 4,328,410; 4,219,721; and 4,128,752. None of these documents recognize the specific problems, as mentioned hereinabove, associated with patterning or texturing the surface of a gas turbine engine component, and in particular a component made of a composite material such as PMR-15, to improve lubricant distribution between interacting gas turbine engine components during engine operation.

A related invention, disclosed in co-pending patent application Ser. No. 07/614,367, filed Nov. 13, 1990, allowed Sep. 12, 1991, entitled "A METHOD FOR MAKING A GAS TURBINE ENGINE COMPONENT", and assigned to the same assignee as the present invention, discloses a method for making an engine component using an ultraviolet laser to prepare a selected surface portion of an unfinished gas turbine engine component or the like for a subsequent bonding or coating step. This Patent Application is incorporated herein by reference.

SUMMARY OF THE INVENTION

It is accordingly a primary object of the present invention to provide a novel method for fabricating a gas turbine engine component which is not subject to the foregoing disadvantages.

It is another object of the present invention to provide a surface patterning method in which the surface is not contacted by an abrasive medium and which is controllable to avoid deformation or damage to the surface.

It is a further object of the present invention to provide a surface patterning method which does not require particulate abrasives, acids or solvents.

It is yet another object of the present invention to provide a method for texturing the surfaces of interacting gas turbine engine components to improve lubricant distribution between the contacting surfaces.

In accordance with the invention, a method for making a gas turbine engine component includes the steps of: providing an unfinished gas turbine engine component, which may be made of a composite material; and selectively patterning a selected surface portion of the engine component, by focusing a laser beam on the selected surface portion of the engine component, to improve distribution of lubricant between the selected surface portion and a surface of another engine component in contact with the selected surface portion during engine operation.

Other objects of the invention, together with features and advantages thereof, will become apparent from the following detailed specification when read with the accompanying drawings in which like reference numerals refer to like elements.

DETAILED DESCRIPTION OF THE PREFERRED EMBODIMENTS

Figure 1A:
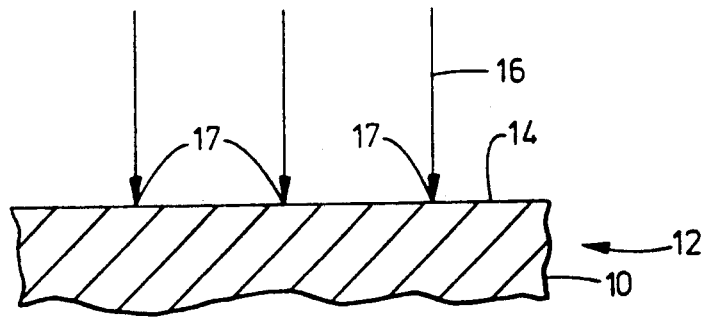
FIGS. 1A-1C are cross-sectional, side elevation views of the steps employed in the gas turbine engine component fabrication method in accordance with the present invention.
Figure 1B:
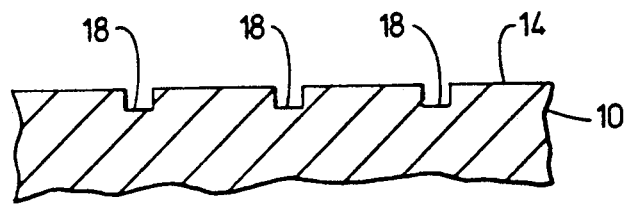

Referring to FIG. 1A, a portion 10 of an unfinished gas turbine engine component 12 has a principal surface 14. In accordance with the present invention, principal surface 14 is selectively patterned by focusing a pulsed ultraviolet laser beam 16 onto a chosen multiplicity of locations 17 on surface 14; a multiplicity of micro-pores 18 are respectively formed at each of locations 17 by laser beam 16, as shown in FIG. 1B.

Figure 1C:
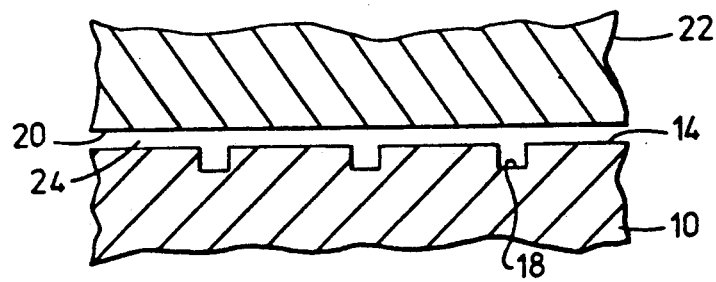

Referring to FIG. 1C, the micro-pores 18 will act as tiny lubrication reservoirs to promote lubricant distribution between surface 14 and a contacting surface 20 of another engine component 22 during engine operation. While micro-pores are shown in FIG. 1C, those skilled in the art will recognize that any micro-pattern design, such as grooves or the like, can be formed in engine component surface 14, using the method of the present invention, to increase lubricant distribution and to decrease wear between gas turbine engine components which have interacting surfaces.

Contacting surface 20 of component 22 may also be selectively patterned by focusing a pulsed UV laser on surface 20 to form a multiplicity of micro-pores (not shown), similar to micro-pores 18 in surface 14.

In accordance with the present invention, laser beam 16 is pulsed with each pulse having a pulse width between about 1 and about 100 nanoseconds, preferably about 20 nanoseconds, and a wavelength between about 190 and about 300 nanometers. The short wavelength is selected to provide a high photon energy which causes the ablation of material on surface 14 at locations 17 (FIG. 1A). The wavelength may be selected by choosing the lasing gas mixture; for example, an argon fluoride mixture will provide a wavelength of 193 nanometers and a krypton fluoride mixture will provide a wavelength of 248 nanometers. The power density of the laser beam may be between about 0.5 joules/sq.cm. and about 100 joules/sq.cm., depending upon the type of materials being fabricated.

Component 10 is preferably a high heat resistant alloy or super-alloy, such as Inconel 718 and the like; although, composite materials, such as PMR-15 (a composite formed by successive layers of interwoven glass or carbon-type fibers which are laminated together by an organic resin) and the like, are finding greater application in gas turbine engines, particularly those used for aircraft engine propulsion because of the weight savings. The texturing of composite material surfaces is discussed in co-pending patent application Ser. No. 07/614,367, filed Nov. 13, 1990, allowed Sep. 12, 1991, entitled "A METHOD FOR MAKING A GAS TURBINE ENGINE COMPONENT", and assigned to the same assignee as the present invention.

Figure 2:
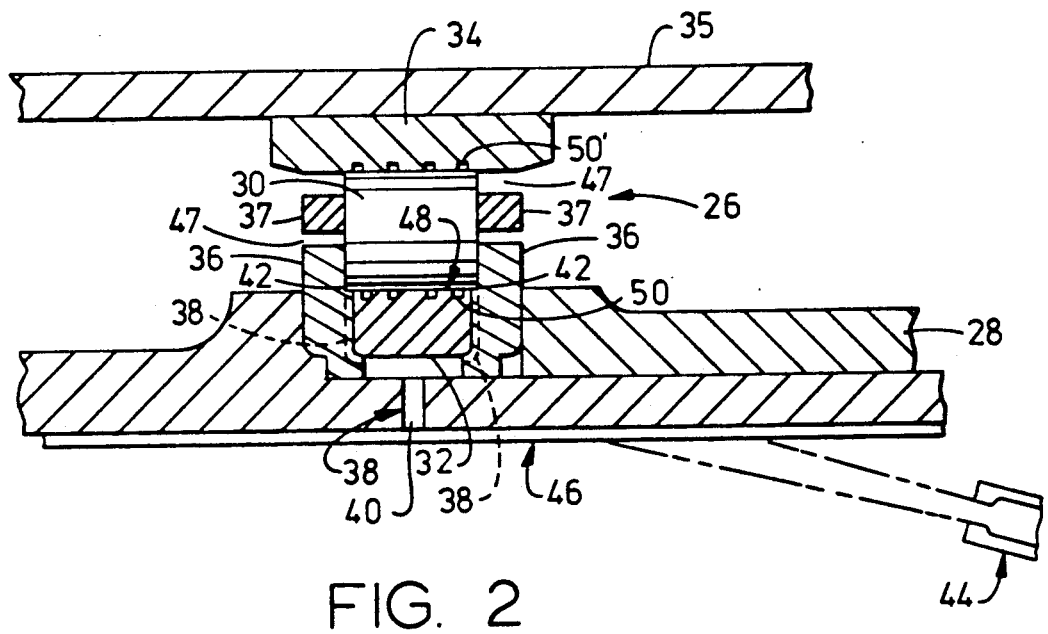
FIG. 2 is a cross-sectional, side elevation view of a roller bearing assembly made in accordance with the present invention.

As an example, one application of the method of the present invention may be in the fabrication of a roller bearing assembly 26 for either a high pressure or low pressure shaft 28 of a gas turbine engine as shown in FIG. 2. Assembly 26 includes a roller bearing 30 that is sandwiched between an inner race or ring 32 and an outer race or ring 34; outer race 34 is mounted to an engine housing 35. A pair of roller guide flanges 36, each respectively extend from inner race 32 on either side of roller bearing 30 to retain the bearing in place during engine operation, and a bearing cage arrangement with members 37, on either side of roller bearing 30, are also provided to retain bearing 30 within races 32 and 34 during engine operation. A plurality 38 of lubricant feed holes or slots are preferably formed between an interior bore 40 of shaft 28 to each end 42 of roller bearing 30. In accordance with the present invention, slots 38 may be formed in the surfaces of race 32 and roller guide flanges 36 by focusing a pulsed UV laser at the chosen locations on the constituents, similar to that described with respect to FIG. 1A.

During engine operation, an oil jet 44 sprays a film 46 of lubricant onto the interior bore 40 of shaft 28; a portion of this lubricant will migrate through feed holes 38 to roller bearing ends 42, to lubricate and dissipate heat from the bearing. Lubricant will be distributed substantially around bearing 30 as it rotates during engine operation and then migrate away from the bearing by passing between the clearance openings 47 between cage member 37 and outer race 34, and between cage member 37 and guide flanges 36, respectively.

In accordance with the present invention, a contacting surface 48 of inner race 32, in contact with roller bearing 30, is selectively patterned to form a plurality of grooves or micro-pores therein, similar to micro-pores 18 in component 10 of FIG. 1C by focusing a pulsed UV laser on selected areas of contacting surface 48. Micro-pores 50 will trap lubricant and act as tiny reservoirs to improve lubrication of bearing 30 when roller bearing 30 rotates. A plurality of micro-pores 50' may be similarly formed in outer race 34 by a pulsed UV laser to further enhance bearing lubrication.

It is to be understood that micro-pores 50 are shown to be much larger than they actually are for purposes of explanation and they may typically be less than, but not necessarily limited to, about 1 micron in depth and width.

Figure 3:
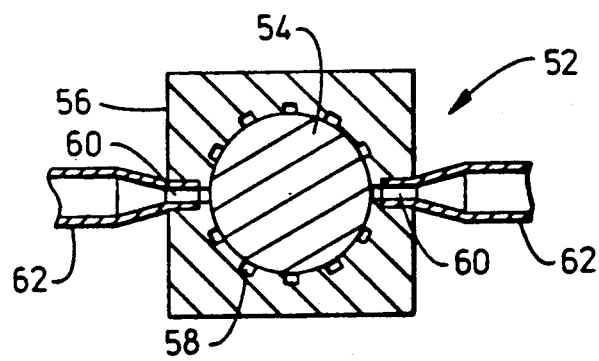
FIG. 3 is a cross-sectional, side elevation view of a shaft mounted in a journal fabricated in accordance with the present invention.

Another example of an application of the method of the present invention is in the fabrication of a shaft and journal or sleeve-type bearing arrangement 52 shown in FIG. 3. Shaft 54 may be a drive shaft for an auxiliary gas turbine engine system, such as an oil pump, fuel pump, electrical generator or the like. Shaft 54 is rotatably mounted in a journal 56 or sleeve-type bearing.

A plurality of micro-grooves 58 may be formed in an inner wall of journal 56 to act as tiny reservoirs for lubricant; the lubricant will be dispersed and cause a film of lubricant to be created between shaft 54 and journal 56 when shaft 54 is rotating. In accordance with the present invention, micro-grooves 58 are formed by focusing a pulsed UV laser beam on the inner wall of journal 56. An opening 60 may be formed through at least one wall of journal 56 through which lubricant may be injected by oil jets 62 to feed micro-grooves 58.

It will be readily understood by those skilled in the art that the present invention is not limited to the specific embodiments described and illustrated herein. Different embodiments and adaptations besides those shown herein and described, as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A method for making a gas turbine engine component, comprising the steps of:
   (a) providing an unfinished gas turbine engine component; and
   (b) selectively patterning a selected surface portion of the engine component by focusing a pulsed ultraviolet laser beam with a selected wavelength and power density on the selected surface portion to ablatively remove material in a selected pattern.

2. The method of claim 1, wherein step (b) comprises the step of forming a multiplicity of micro-pores in the selected surface portion to cause a film of lubricant to disperse between the selected surface portion and a surface of another engine component in contact with the selected surface portion during engine operation.

3. The method of claim 1, wherein the engine component is made of a composite material.

4. The method of claim 1, wherein the laser beam is a pulsed ultraviolet laser beam having a selected wavelength.

5. The method of claim 4, wherein the pulsed laser beam has a pulse width between about 1 and about 100 nanoseconds.

6. The method of claim 4, wherein the laser beam has a pulse width of about 20 nanoseconds.

7. A method for making a roller bearing assembly, comprising the step of selectively patterning an inner wall of each of a pair of roller guide flanges by focusing a laser beam on the inner wall to form a slot therein for distribution of a lubricant to the bearing during operation of the bearing.

8. The method of claim 1, wherein the selected pattern is a plurality of micro-grooves.

9. The method of claim 2, wherein each of the multiplicity of micro-pores is about 1 micron in depth and width.

10. The method of claim 2, wherein each of the multiplicity of micro-pores is less than about 1 micron in depth and width.

11. The method of claim 7, further comprising the step of forming at least one micro-groove in at least one race of the roller bearing assembly by focusing a laser beam on the race.

12. The method of claim 11, wherein a plurality of micro-grooves is formed in each of an inner race and an outer race of the roller bearing assembly by applying a laser beam to each of the races.

13. The method of claim 7, further comprising the step of forming a multiplicity of micro-pores in at least one race of the roller bearing assembly by focusing a laser beam on the race.

14. The method of claim 13, wherein each of the multiplicity of micro-pores is about 1 micron in depth and width.

15. The method of claim 14, wherein the laser beam is a pulsed ultraviolet laser beam with a selected wavelength and power density.

* * * * *